W. H. BUSSEY.
PLANTING BOX.
APPLICATION FILED NOV. 17, 1919.
1,390,337.
Patented Sept. 13, 1921.
3 SHEETS—SHEET 2.
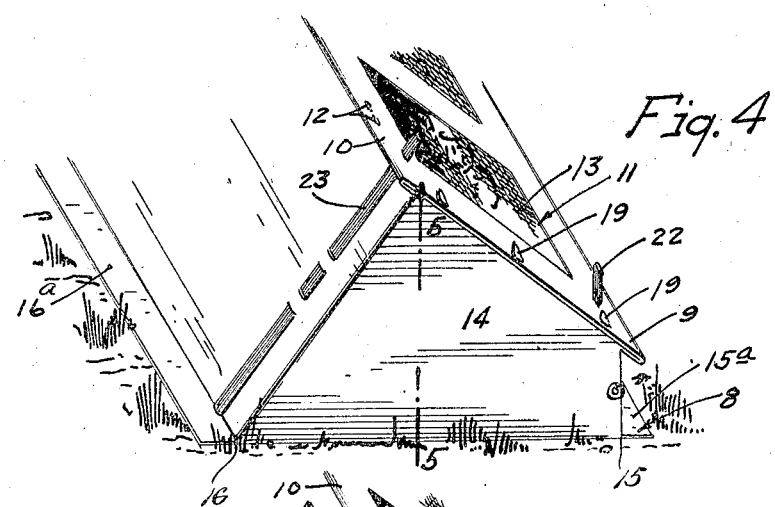
Fig. 4
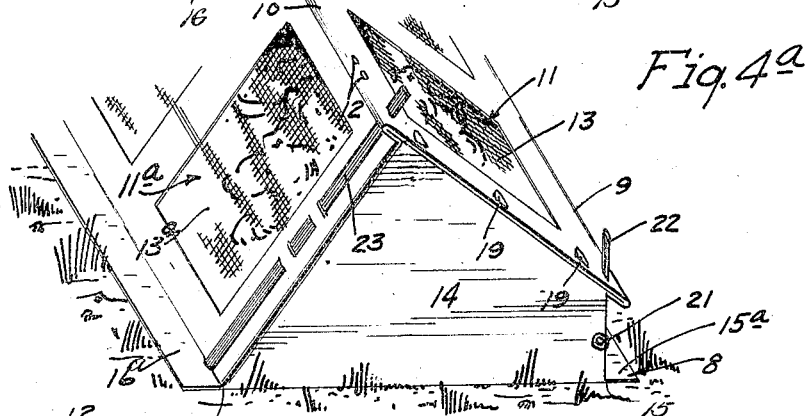
Fig. 4ᵃ
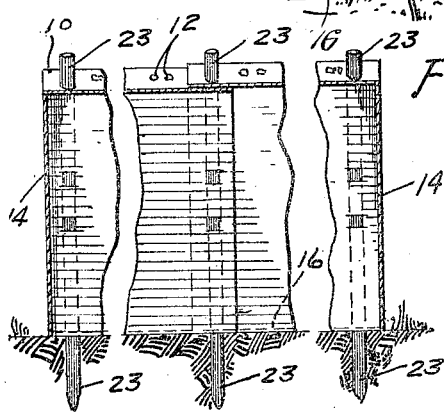
Fig. 5
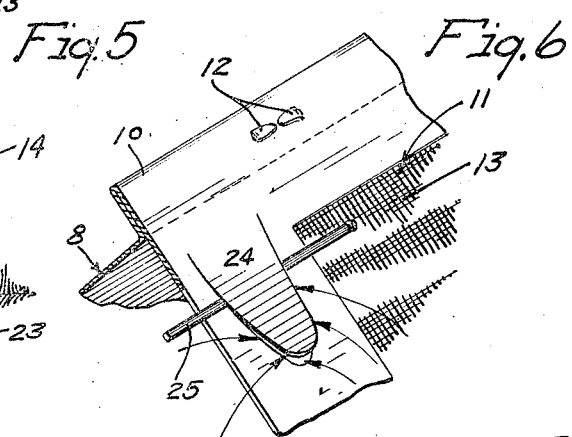
Fig. 6
INVENTOR
William H. Bussey
BY HIS ATTORNEYS

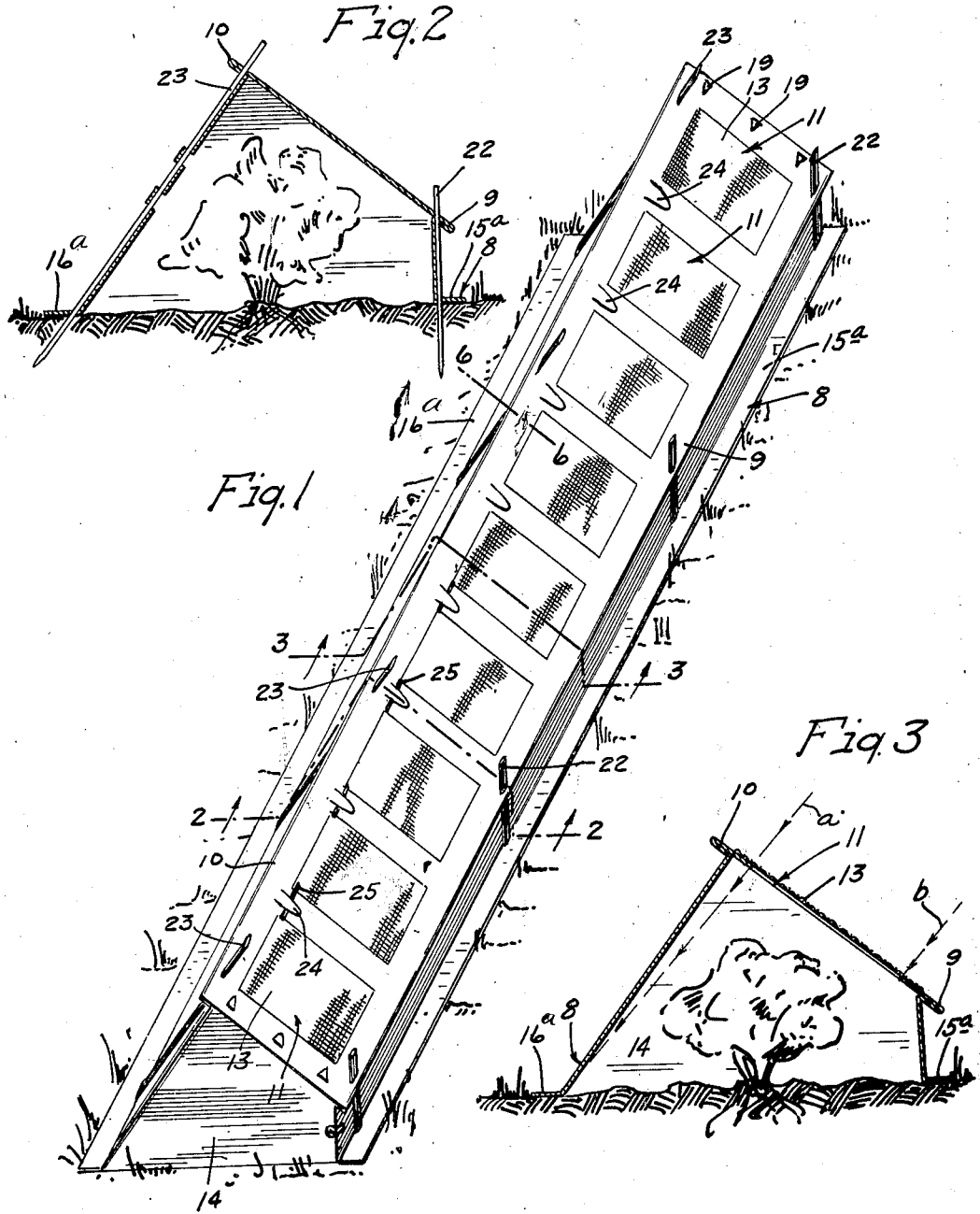

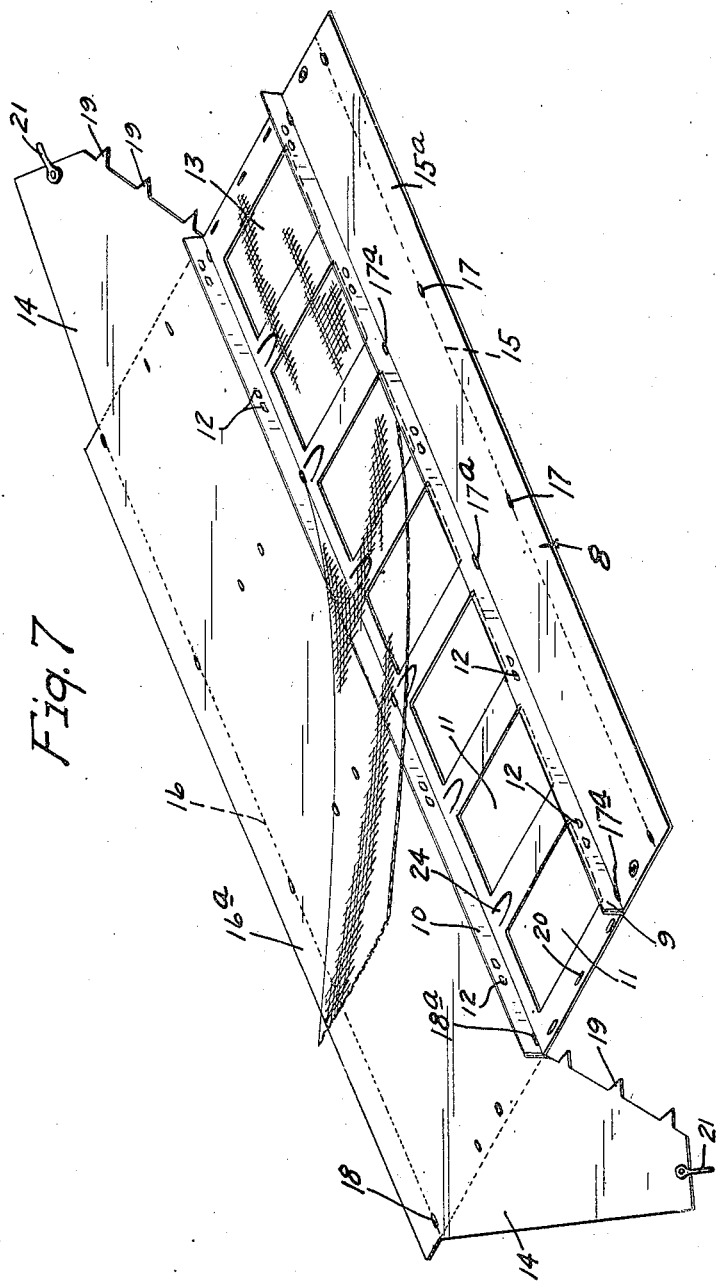

UNITED STATES PATENT OFFICE.

WILLIAM H. BUSSEY, OF MINNEAPOLIS, MINNESOTA.

PLANTING-BOX.

1,390,337.   Specification of Letters Patent.   Patented Sept. 13, 1921.

Application filed November 17, 1919. Serial No. 338,665.

*To all whom it may concern:*

Be it known that I, WILLIAM H. BUSSEY, a citizen of the United States, residing at Minneapolis, in the county of Hennepin and State of Minnesota, have invented certain new and useful Improvements in Planting-Boxes; and I do hereby declare the following to be a full, clear, and exact description of the invention, such as will enable others skilled in the art to which it appertains to make and use the same.

My present invention relates to planting boxes for use in starting garden plants or flowers in early spring and is especially directed to the provision of a planting box adapted for use where plants are in rows. Generally stated, the invention consists of the novel devices and combinations of devices hereinafter described and defined in the claims.

The body of the planting box is made up chiefly of a single strip or strips of heavy paper or cardboard bent into channel shape form and provided with windows covered, either with a transparent or translucent material, such as oil or parchmentized paper, or cheesecloth, for example.

The ends of the planting boxes are closed by suitable end plates and stakes applied in a novel manner to hold the channel strips or body members in shape and anchored to the ground.

The invention, in its preferred form, is illustrated in the accompanying drawings, wherein like characters indicate like parts throughout the several views.

Referring to the drawings:

Figure 1 is a perspective view showing a complete planting box;

Fig. 2 is a section on the line 2—2 of Fig. 1;

Fig. 3 is a section on the line 3—3 of Fig. 1;

Fig. 4 is an enlarged perspective showing one end portion of the box;

Fig. 4ª is a view corresponding to Fig. 4 but illustrating a slightly modified form;

Fig. 5 is a vertical section taken longitudinally approximately on the line 5—5 of Fig. 4, some parts being broken away, illustrating the manner in which several channel-shaped body sections may be lapped to make a very long box;

Fig. 6 is an enlarged fragmentary view in section on the line 6—6 of Fig. 1; and Fig. 7 is a perspective view showing the channel-shaped member laid out flat.

The channel-shape body is made from a single piece of cardboard 8 or other suitable material usually cut and formed substantially as best shown in Fig. 7, by reference to which it will be seen that this sheet has two longitudinal parallel folds or tucks 9 and 10 and is formed with spaced window openings 11 between said tucks. The folded together portions of the tucks 9 and 10 are securely fastened together, preferably by small clenched metallic strips 12. The window openings 11 are covered by a sheet of material, such as cheese cloth or oiled paper 13 which may be closed, or otherwise secured to the sheet 8.

The sheet 8 is adapted to be bent on the lines of its tucks 9 and 10 and is preferably bent so that it has an inclined back and an inclined front, which latter extends to a vertical portion just below the tuck 9.

The end plates 14 should correspond to the desired cross section of the box and may be formed as extensions of the ends of the back-forming portion of the sheet 8. Both at its front and rear longitudinal edges, the sheet 8 is adapted to be bent, preferably on score lines 15 and 16, so that flaps 15ª and 16ª are arranged for direct contact with the ground. On the score line 15, sheet 8 is formed with slits 17 that afford small post holes, and in vertical line therewith, the tuck 9 is formed with similar slits 17ª for the same purpose. On the score line 16, sheet 8 is formed with similar slits 18 and tuck 10 is formed in line therewith, with similar slits 18ª that also afford small post holes. The end portions 14 are formed with lips 19 adapted to be inserted through slits 20 in the ends of the sheet 8 between tucks 9 and 10, and then to be turned over, as shown in Fig. 1. The free edge of the end portions 14 are adapted to be clamped to the front end portions of the body-forming sheet 8 by metallic clips 21 (see particularly Figs. 7 and 1) secured to said end portions and bent against the said body portion.

When the box is formed, it forms a small channel-shaped house having a sort of hip roof, the window-equipped side of which is inclined in such way that when turned toward the south, the same light will reach the ground over almost the entire inclined area, (see particularly dotted lines marked *a—b*, Fig. 3). In the formed house or box, the tucks 9 and 10 project so as to form projected upper and lower eaves in the window-equipped side and so as to permit anchoring stakes in the form of small thin wooden strips 22 and 23, to be applied, as shown in Figs. 1, 2, 4, and 5.

The stakes 22 are relatively short and adapted to be passed through the alined post holes 17 and 17ª and to be driven into the ground, while the posts 23 are relatively long and adapted to be passed through the alined post holes 18 and 18ª and to be driven into the ground (see particularly Fig. 2). The stakes, when thus driven, as is evident, not only anchor the box to the ground but assist in holding the box in shape.

For giving ventilation, when desired, the plate 8 between the upper portions of its windows 11, is formed with partially severed tongues 24 which, when raised, afford air passages through which hot air may escape. These tongues may be held raised by inserting a small piece, such as a piece of a match 25 under the same, as best shown in Fig. 6.

The modification illustrated in Fig. 4ª is like that already described, except that the channel formed strip 8, in its back, is also provided with windows 11ª covered with gauze, oiled paper, or the like, 13ª. The box shown in Fig. 4ª is therefore adapted to be set north and south and to permit the sun to reach the interior of the box, both in forenoon and afternoon.

When a long box is desired, several of the sections made up of the channels 8 may be lapped, as shown in Fig. 5, and in such an arrangement, the end-forming portions 14, at the lapped ends, should be omitted and a pair of stakes 22 and 23 passed through alined post holes in the lapped portions of the two strips 8, so as to couple the same together, as clearly illustrated in Fig. 5. In this way, any desired number of box sections may be coupled together to form a very long planting box.

Planting boxes of the above character may be cheaply made and quickly and easily set up. They may be shipped in flat form, so that there is no danger of breakage and so that there is the desired resulting economy in shipment and convenience in storage. Moreover, they are very efficient for promoting the early planting and safe growing of garden and flower plants in the spring. The utility of such a box will be readily appreciated by all gardeners and others familiar with growing plants.

What I claim is:

1. A planting box having its body made from a sheet bent to form inclined roof and side portions, the inclined roof having windows therein, said body-forming sheet having a tuck at the extremity of its roof portion, and anchoring stakes passed through said tuck and adapted to be driven into the ground to anchor the box.

2. A planting box having its body made from a sheet bent to form inclined roof and side portions, the inclined roof having windows therein, said body-forming sheet having a tuck at the extremity of its roof portion, and anchoring stakes passed through said tuck and adapted to be driven into the ground to anchor the box, said sheet having a ground-engaging edge flap through which said stakes are also passed.

3. A planting box having its body made from a sheet bent to form inclined roof and side portions, the inclined roof having windows therein covered with a material that permits the passage of light into the box, said body-forming sheet having a tuck at the extremity of its roof portion, and anchoring stakes passed through said tuck and adapted to be driven into the ground to anchor the box.

4. A planting box having its body made from a sheet bent to form inclined roof and side portions, the inclined roof having windows therein covered with a material that permits the passage of light into the box, said body-forming sheet having a tuck at the extremity of its roof portion, and anchoring stakes passed through said tuck and adapted to be driven into the ground to anchor the box, said sheet having a ground-engaging edge flap through which said stakes are also passed.

5. A planting box having its body made from a sheet bent to form inclined roof and side portions, the inclined roof having windows therein covered with a material that permits the passage of light into the box, the window-equipped roof forming portion of said sheet at its upper and lower edges having extended tucks, and the said sheet, at all edges, having ground-engaging flaps, and stakes passed through said tucks and ground-engaging flaps and adapted to be driven into the ground to anchor the box.

6. A planting box having its body made from a sheet bent to form inclined roof and side portions, the inclined roof having windows therein covered with a material that permits the passage of light into the box, the window-equipped roof forming portion of said sheet at its upper and lower edges having extended tucks, and the said sheet, at all edges, having ground-engaging flaps, and stakes passed through said tucks and ground-engaging flaps and adapted to be driven into the ground to anchor the box, and end plates interlocked to said sheet and closing the ends of the box.

7. A planting box having its body made from a sheet bent to form inclined roof and side portions, the inclined roof having windows therein covered with a material that permits the passage of light into the box, the window-equipped roof forming portion of said sheet, at its upper and lower edges, having extended tucks, and the said sheet, at all edges, having ground-engaging flaps, and stakes passed through said tucks and ground-engaging flaps and adapted to be driven into the ground to anchor the box, the back-forming portion of said sheet being inclined in a direction reverse to the window-equipped roof-forming portion thereof.

8. A planting box having its body made from a sheet bent to form inclined roof and side portions, the inclined roof having windows therein covered with a material that permits the passage of light into the box, the window-equipped roof forming portion of said sheet, at its upper and lower edges, having extended tucks, the said sheet, at all edges, having ground-engaging flaps, stakes passed through said tucks and ground-engaging flaps and adapted to be driven into the ground to anchor the box, the back-forming portion of said sheet being inclined in a direction reverse to the window-equipped roof-forming portion thereof, and the said back-forming portion having windows therein covered by a material permitting light to enter the box.

9. A planting box made up of a plurality of sheets bent to form inclined roof and side portions, the inclined roof having windows therein covered with a material that permits the passage of light into the box, and anchoring strips passed through projecting portions of the sheet and adapted to be driven into the ground to anchor the box, the ends of the several box forming sheets being lapped and certain of said stakes being passed through the lapped portions to couple the box sections together.

10. A planting box having its body made from a sheet bent to form inclined roof and side portions, the inclined roof having windows therein covered with a material that permits the passage of light into the box, the said sheet having partially severed lips which, when bent from position, afford ventilating passages.

In testimony whereof I affix my signature in the presence of two witnesses.

WILLIAM H. BUSSEY.

Witnesses:
EVA E. KÖNIG,
HARRY D. KILGORE.